(12) United States Patent
Shinohara

(10) Patent No.: US 7,177,309 B2
(45) Date of Patent: Feb. 13, 2007

(54) PACKET SWITCHING EQUIPMENT AND SWITCHING CONTROL METHOD

(75) Inventor: Masayuki Shinohara, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 891 days.

(21) Appl. No.: 09/945,758

(22) Filed: Sep. 5, 2001

(65) Prior Publication Data

US 2002/0027914 A1    Mar. 7, 2002

(30) Foreign Application Priority Data

Sep. 6, 2000   (JP) .............................. 2000/269458

(51) Int. Cl.
   *H04L 12/28* (2006.01)
(52) U.S. Cl. ................ 370/389; 370/429; 370/230; 370/235; 370/462
(58) Field of Classification Search ................ 370/229, 370/236, 230.1, 231, 389, 401, 412, 413, 370/428, 429
See application file for complete search history.

(56) References Cited

U.S. PATENT DOCUMENTS

| | | | | |
|---|---|---|---|---|
| 4,761,780 A | * | 8/1988 | Bingham et al. | 370/411 |
| 4,797,880 A | * | 1/1989 | Bussey et al. | 370/411 |
| 4,899,334 A | * | 2/1990 | Shimizu | 370/411 |
| 5,216,668 A | * | 6/1993 | Zhang | 370/411 |
| 5,361,255 A | * | 11/1994 | Diaz et al. | 370/374 |
| 5,367,518 A | * | 11/1994 | Newman | 370/414 |
| 5,440,553 A | * | 8/1995 | Widjaja et al. | 370/411 |
| 5,517,495 A | | 5/1996 | Lund et al. | |
| 5,550,815 A | * | 8/1996 | Cloonan et al. | 370/396 |
| 5,568,477 A | * | 10/1996 | Galand et al. | 370/229 |
| 5,648,957 A | * | 7/1997 | Lee et al. | 370/355 |
| 5,689,508 A | * | 11/1997 | Lyles | 370/391 |

(Continued)

FOREIGN PATENT DOCUMENTS

JP    01-238248    9/1989

(Continued)

OTHER PUBLICATIONS

Hui et al., "A Broadband Packet Switch for Integrated Transport", IEEE Journal on Selected Areas in Communications, vol. SAC-5, No. 8, Oct. 1987, pp. 1264-1273.

(Continued)

*Primary Examiner*—Ricky Q. Ngo
*Assistant Examiner*—Andrew C. Lee
(74) *Attorney, Agent, or Firm*—Harrity Snyder, LLP

(57) ABSTRACT

A packet switching equipment and a switch control system employing the same performs operation of the switch core portion independent of content of decision of an arbiter portion and overall equipment can be constructed with simple control structure. The packet switching equipment includes input buffer portions temporarily storing packets arriving to the input ports and outputting packets with adding labels indicative of destination port numbers, a switch core portion for switching the packets on the basis of labels added to the input buffer portions, and an arbiter portion adjusting input buffer portions to provide output permissions for outputting to the output ports. A sorting network autonomously sorting and concentrating the packets on the basis of the labels added to the packets is employed in the switch core portion.

13 Claims, 12 Drawing Sheets

U.S. PATENT DOCUMENTS

| | | | | |
|---|---|---|---|---|
| 5,784,003 | A * | 7/1998 | Dahlgren | 340/2.2 |
| 5,844,887 | A * | 12/1998 | Oren et al. | 370/218 |
| 6,026,092 | A * | 2/2000 | Abu-Amara et al. | 370/411 |
| 6,441,935 | B1 * | 8/2002 | Araki et al. | 398/52 |
| 6,553,031 | B1 * | 4/2003 | Nakamura et al. | 370/392 |
| 6,628,655 | B1 * | 9/2003 | Fieschi et al. | 370/389 |
| 6,687,247 | B1 * | 2/2004 | Wilford et al. | 370/392 |
| 6,721,324 | B1 * | 4/2004 | Shinohara | 370/395.1 |
| 6,847,644 | B1 * | 1/2005 | Jha | 370/392 |
| 6,917,620 | B1 * | 7/2005 | Sindhu et al. | 370/401 |
| 6,990,097 | B2 * | 1/2006 | Norman et al. | 370/386 |
| 6,999,413 | B2 * | 2/2006 | Moriwaki et al. | 370/228 |
| 2001/0023469 | A1 * | 9/2001 | Jeong et al. | 710/241 |

FOREIGN PATENT DOCUMENTS

| | | |
|---|---|---|
| JP | 02-54653 | 2/1990 |
| JP | 02-179144 | 7/1990 |
| JP | 02-288439 | 11/1990 |
| JP | 4-72939 | 3/1992 |
| JP | 5-167605 | 7/1993 |
| JP | 6-232909 | 8/1994 |
| JP | 09-321768 | 12/1997 |
| JP | 10-65703 | 3/1998 |
| JP | 10-210065 | 8/1998 |
| JP | 11-177624 | 7/1999 |
| KR | 91-17806 | 11/1991 |
| KR | 98-13126 | 4/1998 |
| KR | 10-0222223 | 7/1999 |
| KR | 2001-0036027 | 5/2001 |
| KR | 10-0384996 | 5/2003 |

OTHER PUBLICATIONS

K.E. Batcher, "Sorting Networks and their Applications", Spring Joint Computer Conference, 1968, pp. 307-315.

Korean Office Action dated Sep. 24, 2003, with Japanese translation and partial English translation.

European Search Report dated Feb. 26, 2004.

Michael G. Hluchvj. et al., "Queueing in High-Performance Packet Switching", IEEE Journal on Selected Areas in Communications, vol. 6, No. 9, Dec. 1, 1988, pp. 1587-1597, XP002023972.

Ra'ed Y. Awdeh, et al., "Survey of ATM Switch Architectures", Computer Networks and ISDN Systems, vol. 27, No. 12, Nov. 1, 1995, pp. 1567-1613, XP004002747.

Canadian Search Report dated Nov. 4, 2004.

Michael G. Hluchyj, et al., "Queueing in High-Performance Packet Switching", IEEE Journal on Selected Areas in Communications, vol. 6, No. 9, Dec. 1, 1988, pp. 1587-1597, XP002023972.

* cited by examiner

PACKET FORMAT IN EQUIPMENT 300

PACKET SWITCHING EQUIPMENT AND SWITCHING CONTROL METHOD

BACKGROUND OF THE INVENTION

1. Field of the Invention

The present invention relates generally to a packet switching equipment and a switching control method. More particularly, the invention relates to a switching control system in a packet switching equipment for switching a packet between a particular input port and a particular output port by employing packet communication technology, such as ATM (Asynchronous Transfer Mode), IP (Internet Protocol) and so forth.

2. Description of the Related Art

Conventionally, a packet switching equipment of this kind is constructed with input buffer portions 1-1 to 1-n [input buffer portions 1-2 to 1-(n-1) are eliminated from illustration] which will be occasionally identified by reference numeral 1 as generally referred to, an arbiter portion 2 and a switch core portion 5 as shown in FIG. 11.

The switch core portion 5 performs switching of the packet between input ports 100-1 to 100-n [input ports 100-2 to 100-(n-1) are eliminated from illustration] which will be occasionally identified by reference numeral 102 as generally referred to, and output ports 101-1 to 101-n [output ports 101-2 to 101-(n-1) are eliminated from illustration] which will be occasionally identified by reference numeral 101 as generally referred to.

Each of input buffer portions 1-1 to 1-n includes logic queue 11-1 to 11-n [logic queues 11-2 to 11-(n-1) are eliminated from illustration] which will be occasionally identified by reference numeral 11 as generally referred to, a packet input portion 12 and a packet output portion 13 and temporarily store the packets arriving to the input ports 100-1 to 100-n. The arbiter portion 2 performs arbitration of output demand from the input buffer portions 1-1 to 1-n for outputting an output permission depending upon result of arbitration and applies opening and closing command to points of intersections in the switch core portion 5.

As the switch core portion 5, as shown in FIG. 12, it has been considered a construction for opening and closing (ON/OFF) of the points of intersections 50 of transmission paths extending in grating form. In this construction, when a plurality of input ports 100 transmit packets to a particular output port 101 simultaneously, packet collision is caused for breakage of data transferred by the packets. Therefore, at the same timing, the input port 100 to transmit the packet to the particular output port has to be limited to one.

Next, discussion will be given for operation of the conventional packet switching equipment. The packets arriving to the input ports 100-1 to 100-n are stored in the logic queues 11-1 to 11-n in the respective input buffer portions. The input buffer portions 1-1 to 1-n check destination output ports 101-1 to 101-n from header information of the leading packets of the logic queues 11-1 to 11-n and notify an output demand for outputting to a destination output port, to the arbiter portion 2 by an output demand signal.

The arbiter portion 2 aggregates output demand signals from all input buffer portions 1-1 to 1-n. When output demands from a plurality of input buffer portions 1-1 to 1-n are present for the same output ports 101-1 to 101-n (upon occurrence of conflict), arbitration is performed for providing an output permission only for selected one of the input buffer portions 1-1 to 1-n.

The arbiter portion 2 performs arbitration for avoiding packet collision at all output ports 101-1 to 101-n. Thereafter, acceptance and rejection of demand is notified to the input buffer portions 1-1 to 1-n by using the output permission signal. The input buffer portion n which is accepted the demand transmits the leading packet to the switch core portion 5. The switch core portion 5 opens and closes the points of intersections 50 for switching the predetermined output ports 101-1 to 101n on the basis of the result of arbitration obtained from the arbiter portion 2.

As shown in FIG. 13, in the above-mentioned conventional packet switching equipment, when the arbiter portion 2 made decision to permit outputting to the output port #2 for the input buffer #0 which contains the leading packet designated to the output port #2, the output permission for outputting to the output port #2 is given for the input buffer #0 from the arbiter portion 2. At the same time, the switch core portion 5 is commanded to close the point of intersection between the input port #0 and the output port #2 and is controlled so that packet can be switched between the objected ports.

As set forth above, the conventional construction requires control of the switch core portion 5 corresponding to the content of decision in the arbiter portion 2 and thus requires synchronous operations of the input buffer portions 1-1 to 1-n, arbiter portion 2 and the switch core portion 5 without disturbance to make control structure of the switch core portion 5 complicate.

SUMMARY OF THE INVENTION

Therefore, the present invention has been worked out in view of the problem set forth above. It is an object of the present invention to provide a packet switching equipment and a switching control method, in which operation of the switch core portion is performed independent of content of decision of an arbiter portion and overall equipment can be constructed with simple control structure.

According to the first aspect of the present invention, a packet switching equipment for switching packets between input ports and output ports, comprises:

input buffer portions temporarily storing packets arriving to the input ports and outputting packets with adding labels indicative of destination port numbers;

a switch core portion for switching the packets on the basis of labels added to the input buffer portions; and an arbiter portion adjusting input buffer portions to provide output permissions for outputting to the output ports, a sorting network autonomously sorting and concentrating the packets on the basis of the labels added to the packets being applied to the switch core portion.

According to the second aspect of the present invention, switching control method for a packet switching equipment for switching packets between input ports and output ports, comprises the steps of:

outputting packets with adding labels indicative of destination port numbers by input buffer portions temporarily storing packets arriving to the input ports;

switching the packets on the basis of labels added to the input buffer portions by a switch core portion;

adjusting input buffer portions to provide output permissions for outputting to the output ports by an arbiter portion; and employing a sorting network autonomously sorting and concentrating the packets on the basis of the labels added to the packets in the switch core portion.

In the construction set forth above, the switch core portion executes autonomous sorting and concentration only with reference to the labels added to the input packets, and is independent of the contend of decision of the arbiter portion. Therefore, it becomes unnecessary to employ complicate control structure establishing synchronization over the entire packet switching equipment, and thus, control of the packet switching equipment can be made simple.

In the preferred construction, the arbiter portion may execute an output destination adjusting process for providing output permission for outputting to the output ports for the input buffer portions storing the packets with avoiding overlapping and a vacant port adjusting process assigning idle output ports not occupied by any input buffer portions for idle input buffer portions not obtaining output permission. The input buffer portions assigned the output ports by the output destination adjusting process, may output packets to the assigned output ports and the input buffer ports assigned the output ports by the vacant port adjusting process may generate and output dummy packets addressed to the assigned output ports.

By outputting the dummy packet from the idle input buffer portions assigned the idle output ports, in the case where the sorting network for sorting and concentrating the packets in order of labels, the packets can be accurately switched to the objective output ports.

The packet switching equipment may further comprise a packet filtering portion provided corresponding to respective output ports and passing only valid packets and abandoning null dummy packets on the basis of information applied in own equipment and identifying valid packet and null dummy packet.

Thus, the null dummy packet will never be output externally from the packet switching equipment to restrict wasting of the network resource.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a packet switching equipment according to the present invention with reference to the accompanying drawings. In the following description, numerous specific details are set forth in order to provide a thorough understanding of the present invention.

Figure 1:
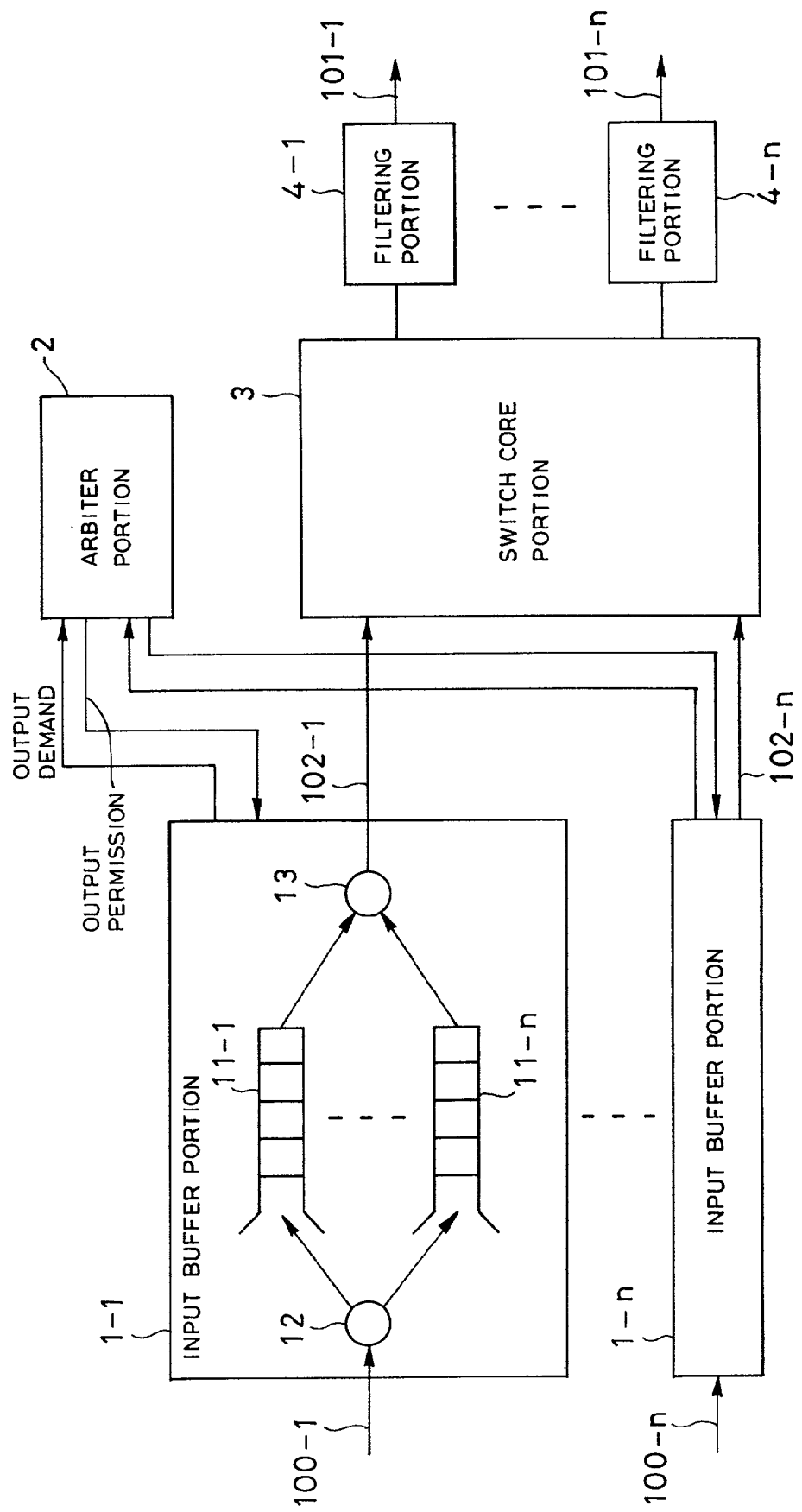
FIG. 1 is a block diagram showing a construction of one embodiment of a packet switching equipment according to the present invention.

FIG. 1 is a block diagram showing a construction of one embodiment of the packet switching equipment according to the present invention. In FIG. 1, one embodiment of the packet switching equipment is constructed with input buffer portions 1-1 to 1-n [input portions 1-2 to 1-(n-1) are eliminated from illustration] which will be identified by a reference numeral 100 as generally referred to, a switch core portion 3, an arbiter portion 2 and filtering portions 4-1 to 4-n [filtering portions 4-2 to 4-(n-1) are eliminated from illustration] which will be identified by reference numerals 4 as generally referred to. The input buffers 1-1 to 1-n includes logic queues 11-1 to 11-n [logic queues 11-2 to 11-(n-1) are eliminated from illustration] which will be identified by reference numeral 11 as generally referred to, a packet input portion 12 and a packet output portion 13.

The logic queues 11-1 to 11-n are constructed to store all of arriving packets in FIFO (First In First Out) manner. It may also be possible to have a construction to provide FIFO per flow, in which packet belongs. In either case, the present invention is applicable and equivalent effect may be achieved. The construction of the logic queues 11-1 to 11-n should not serve as limitative factor for the present invention.

In the later case, the packet input portion 12 extracts flow identifier from the header portion of the packet arriving to the input ports 100-1 to 100-n [input ports 100-2 to 100-(n-1) are eliminated from illustration] which will be identified by the reference numeral 100 as generally referred to, and recognizes a service class, in which packet belongs, and a destination output port by making reference to a flow information database with taking the flow identifier as key. On the basis of the result of recognitions, the packets are stored in appropriate logic queues 11-1 to 11-n.

On the other hand, for the input buffer portions 1-1 to 1-n, numbers for identification are assigned. In the shown embodiment, for port number N, integer in a range of 0 to N−1 are assigned.

The switch core portion 3 for switching between the input ports 100-1 to 100-n and output ports 101-1 to 101-n [output ports 101-2 to 101-(n-1) are eliminated from illustration] which will be identified by reference numeral 101 as generally referred to, is constructed with a sorting network. As the sorting network, it may be a Batcher network proposed in "Sorting Networks and Their Applications" (K. E. Batcher, Proc. 1968, Spring Joint Computer Conf., pp. 307 to 314).

Figure 2:
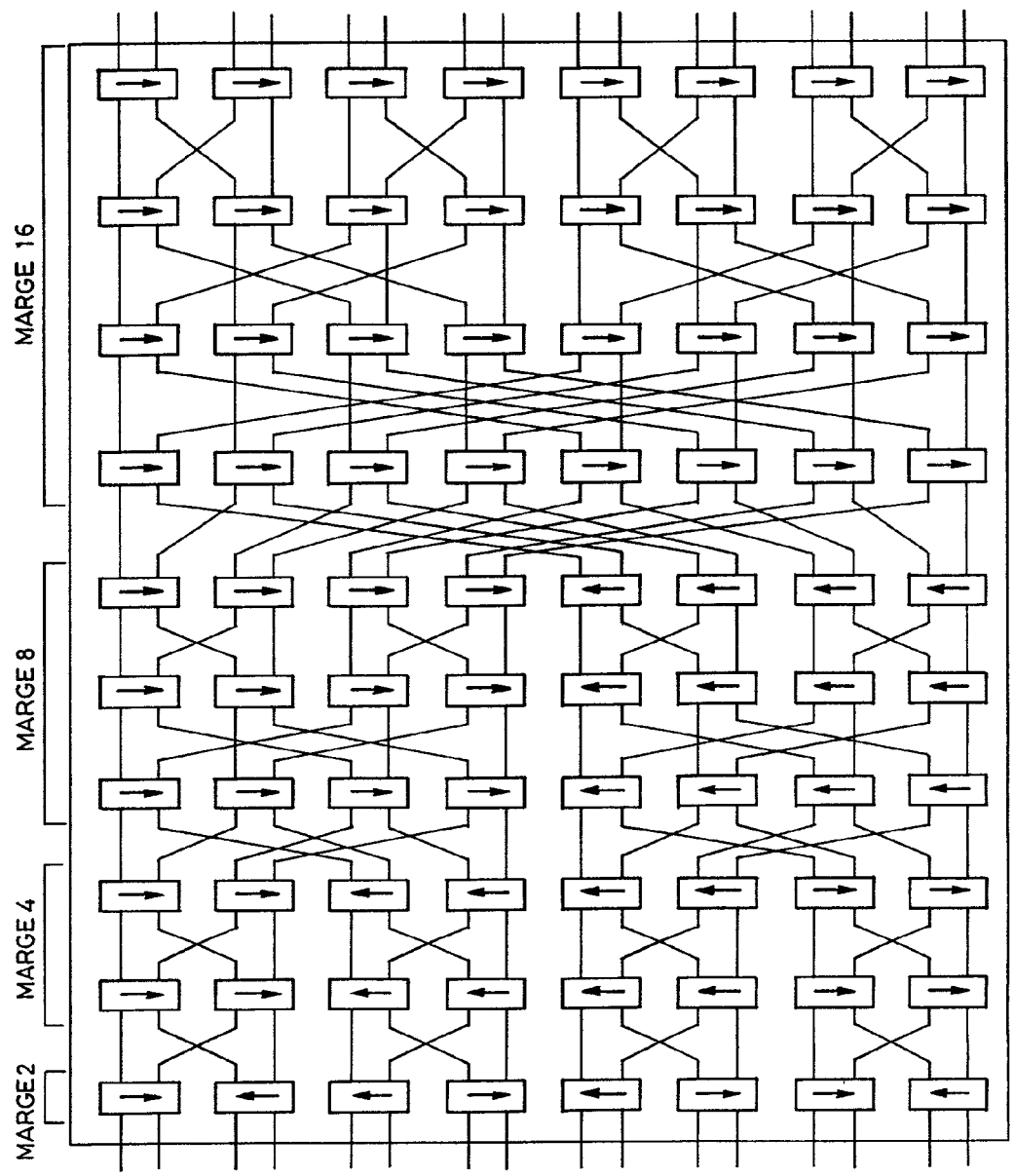
FIG. 2 is an illustration showing a construction of a Batcher network of input port number=output port number=16.

FIG. 2 is an illustration showing a construction of the Batcher network of input port number=output port number=16. In FIG. 2, the Batcher network has simple construction, in which 2×2 unit switches are connected in plurality of stages. In the unit switch, the packet having greater label value is sorted in outgoing line of direction of arrow to be output.

By repeating sorting the packet containing the destination port number as label value in each stage toward output direction, the label values are sorted in ascending order and output from the Batcher network. It should be noted that the output packet of the Batcher network is concentrated in order of the label, and not necessarily output to the objective output port.

Figure 3:
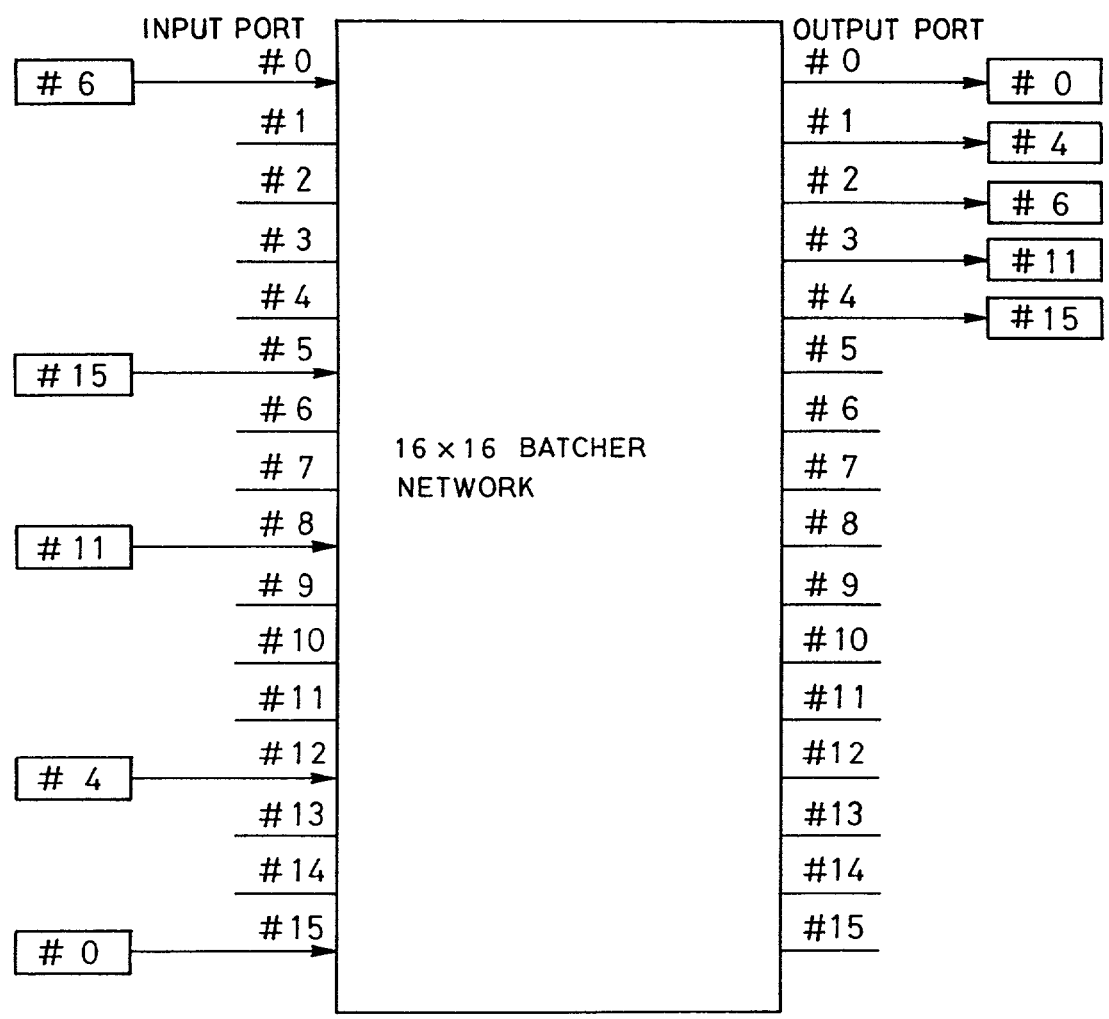
FIG. 3 is an illustration showing a condition where packets having destination portion numbers #0, #4, #6, #11, #15 are sorted by the Batcher network.

FIG. 3 is an illustration showing a condition where packets having destination portion numbers #0, #4, #6, #11, #15 are sorted by the Batcher network. In FIG. 3, while the packet having the destination port number #0 is output from the objective output port, other packets are not output from the objective output port.

By providing Banyan network performing self-routing of the packet in the later stage of the Batcher network, the packet can be output to the objective output port. This construction is called as Batcher-Banyan network and has been proposed in "A Broadband Packet Switch for Integrated Transport" (J. Y. Hui, IEEE J. Sel. Areas Comm., Vol. SAC-5, No. 8, pp 1264-1273, October 1987).

In the Batcher-Banyan network, a routing network becomes necessary in addition to the sorting network to cause increasing of hardware amount. The switch core portion 3 of the packet switching equipment according to the present invention is constructed with the sorting network and the equipment is constructed with smaller hardware amount.

Figure 4:
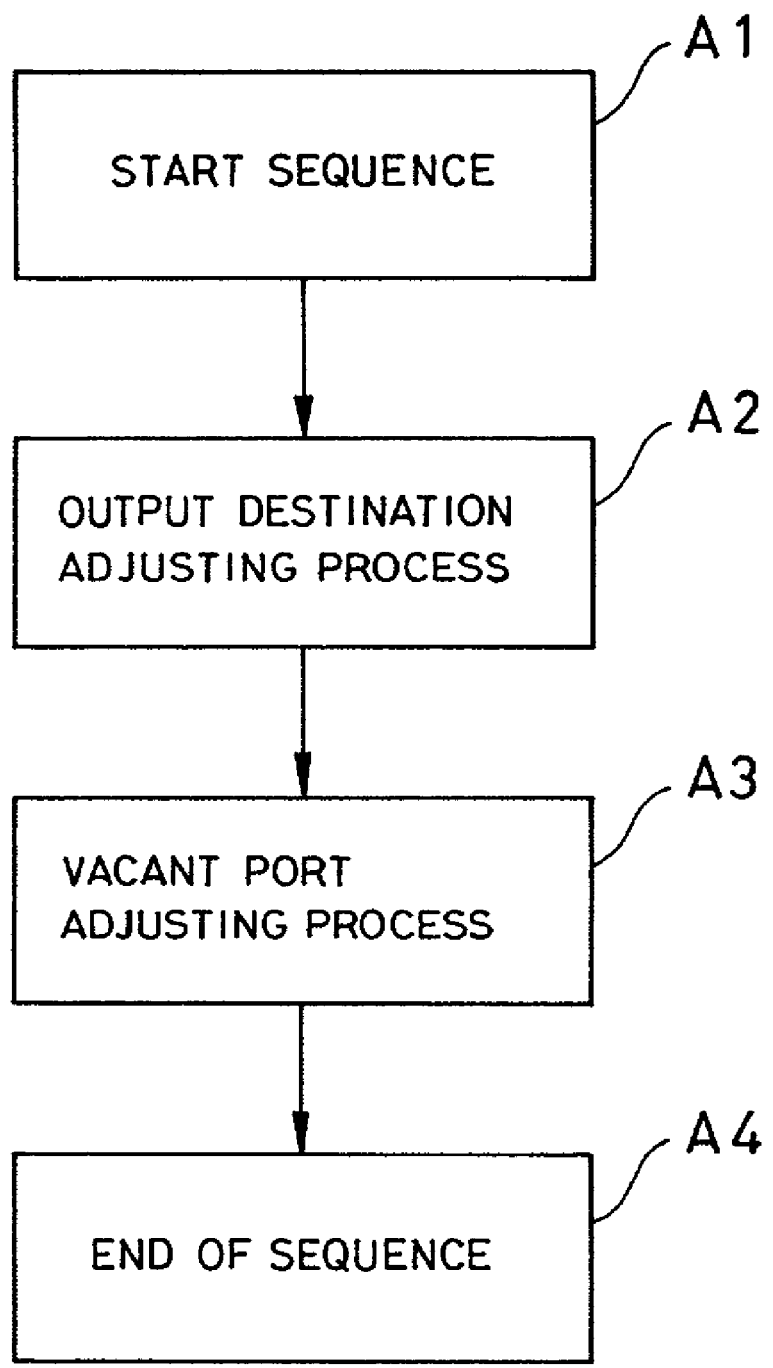
FIG. 4 is a flowchart showing a flow of arbitration process executed in the arbiter portion of FIG. 1.
Figure 5:
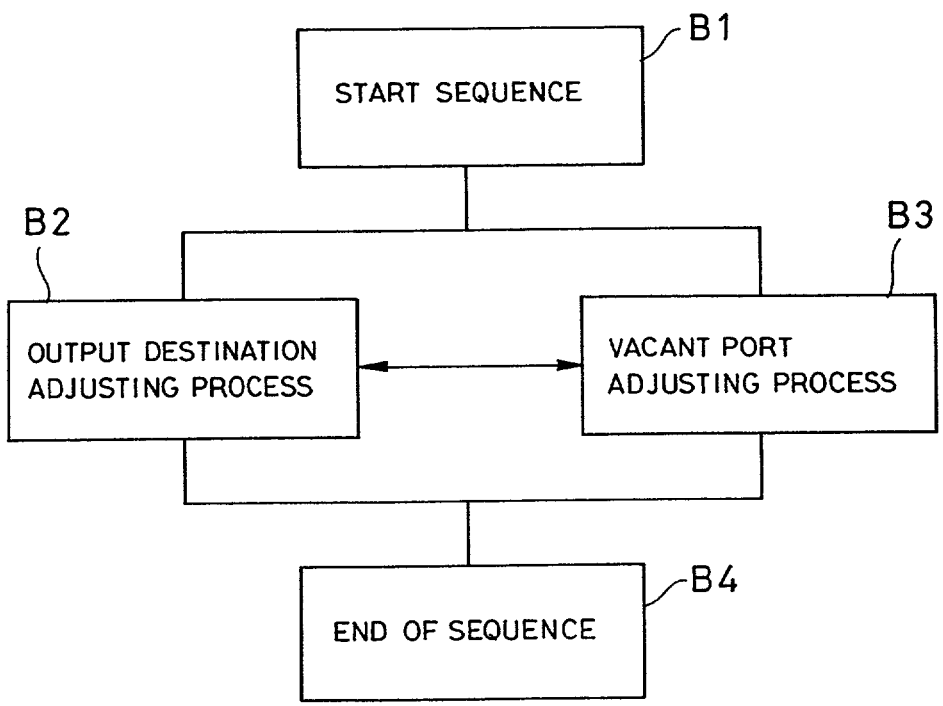
FIG. 5 is a flowchart showing a flow of arbitration process executed in the arbiter portion of FIG. 1.

FIGS. 4 and 5 are flowcharts showing a flow of arbitration process executed in the arbiter portion 2 of FIG. 1. Arbitration process is consisted of an output destination adjusting process for providing output permissions for outputting to the output ports 101-1 to 101-n for the input buffer portions 1-1 to 1-n containing packets with avoiding overlapping, and vacant port adjusting process for assigning idle output ports not occupied by any input buffer portion 1-1 to 1-n to idle input buffer portions not obtaining output permission.

As shown in FIG. 4, by executing the output destination adjusting process at first (step A2 of FIG. 4), the output permissions for outputting to the output ports 101-1 to 101-n are given for the input buffer portions 1-1 to 1-n having packets to be output, and then the vacant port adjusting process is executed (step A3 of FIG. 4) for assigning the idle output ports to the idle input buffer portions.

On the other hand, as shown in FIG. 5, the output destination adjusting process (step B2 of FIG. 2) and the vacant port adjusting process (step B3 of FIG. 5) are executed in parallel with exchanging information with each other.

In this case, both of output destination adjusting process and the vacant port adjusting process are simply required to be completed until the packets are output from the input buffer portions 1-1 to 1-n. Manner of combination of the output destination adjusting process and the vacant port adjusting process does not limit the present invention, and various modifications associating with this should be encompassed within a scope of the present invention.

Figure 6:
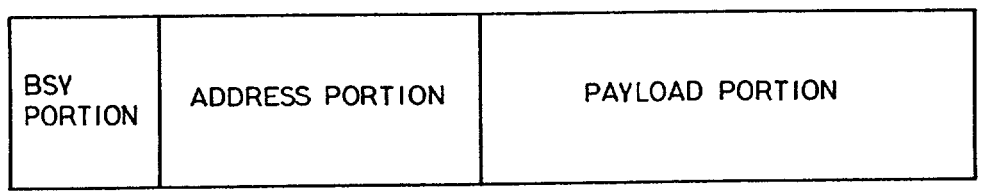
FIG. 6 is an illustration showing one example of a packet format in the equipment output from the input buffer portion of FIG. 1.

FIG. 6 is an illustration showing one example of a packet format in the equipment output from the input buffer portions 1-1~1-n of FIG. 1. In FIG. 6, a packet format 300 in the equipment is consisted of a BSY portion, an address portion and a payload portion. The BSY portion is an identifier indicating whether the packet constructed with the shown format is valid or not, in which a null packet is indicated by "0" and a valid packet is indicated by "1".

The externally input packet is stored in the payload portion in the packet input portion 12, and the BSY portion is set to "1". In the input buffer portions 1-1 to 1-n which obtain the output permission by the output destination adjusting process, the packet having "1" in the BSY portion is taken out from the logic queues 11-1 to 11-n for outputting by setting the destination output port number in the address portion as label, at the packet output portion 13.

When the output permission is obtained by the vacant port adjusting process, the packet output portion 13 sets "0" in the BSY portion and the assigned vacant port number in the address portion as label to generate a dummy packet for outputting without taking out the packet from the logic queues 11-1 to 11-n.

The filtering portions 4-1 to 4-n arranged per output ports 101-1 to 101-n make reference to the BSY portion of the packet format to pass the packet of BSY "1" and abandon the packet of BSY="0". This is for preventing the null dummy packet generated in the packet switching equipment from being output externally from the equipment.

Figure 7:
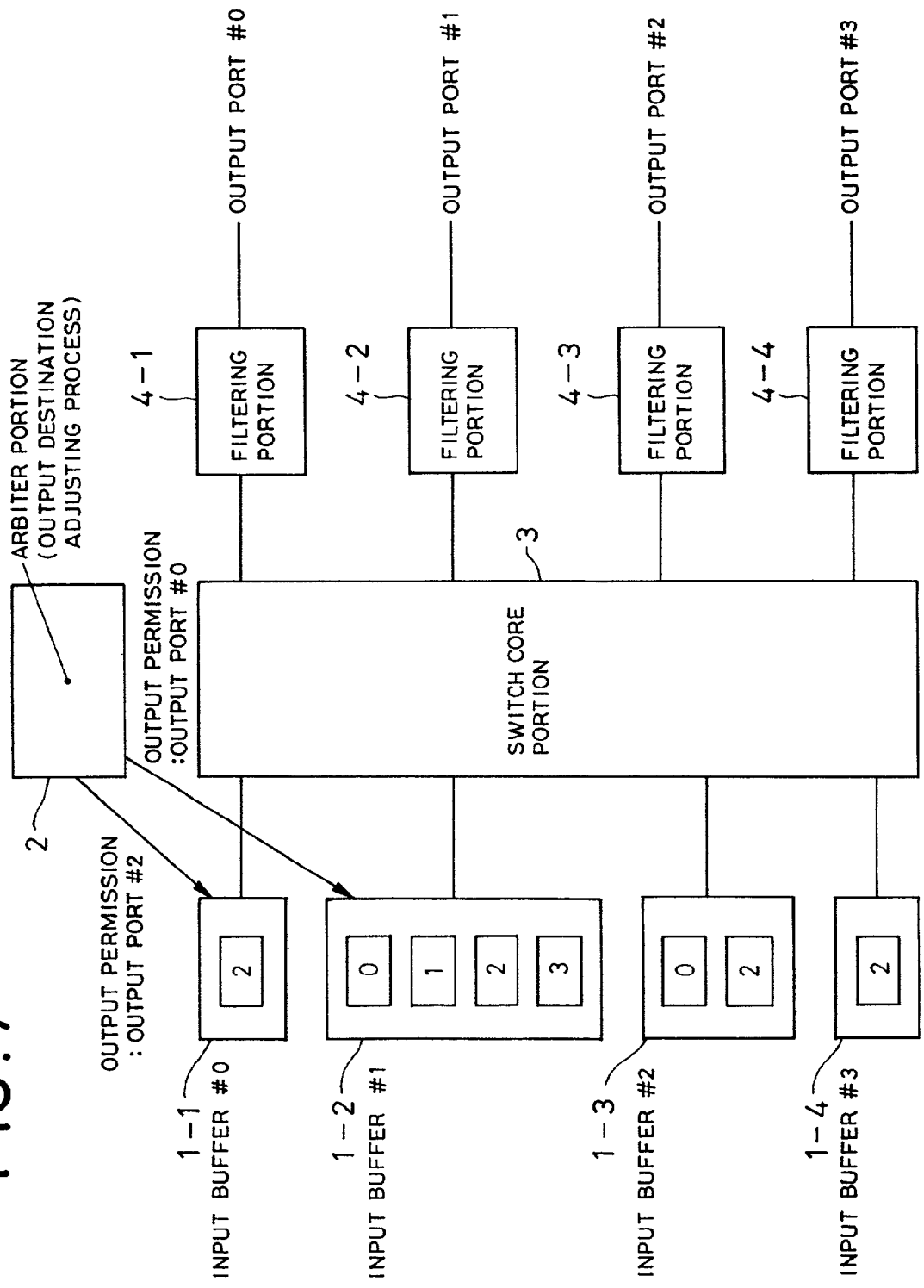
FIG. 7 is an illustration showing a packet switching operation in one embodiment of the packet switching equipment according to the present invention.

FIG. 7 is an illustration showing a packet switching operation in one embodiment of the packet switching equipment according to the present invention. Here, as input and output port number/input buffer number, 0, 1, 2, 3 are assigned.

As initial condition, the input buffer #0 has the packet addressed to the output port #2, and the input buffer #1 has the packets addressed to the output ports #0, #1, #2 and #3. The input buffer #2 has packets addressed to output ports #0 and #2. The input buffer #3 has the packet addressed to the output port #2. It should be noted that, in the shown embodiment, discussion will be given for packet switching operation on the basis of the arbitration process shown in FIG. 4. It should be noted that, even with the arbitration process shown in FIG. 5, packet switching can be performed similarly to the packet switching operation shown in FIG. 4.

In FIG. 7, the output destination adjusting process of the arbiter portion 2 provides the output permission for outputting to the output port #2 for the input buffer #0, and the output permission for outputting to the output port #0 for the input buffer #1. Method for assigning the output permission is not limited to the shown method but can be any applicable methods. At this time, the idle output ports are the output ports #1 and #3, and the input buffers #2 and #3 do not have a packet which can be output to the idle output ports and thus are idle input buffer portions.

Figure 8:
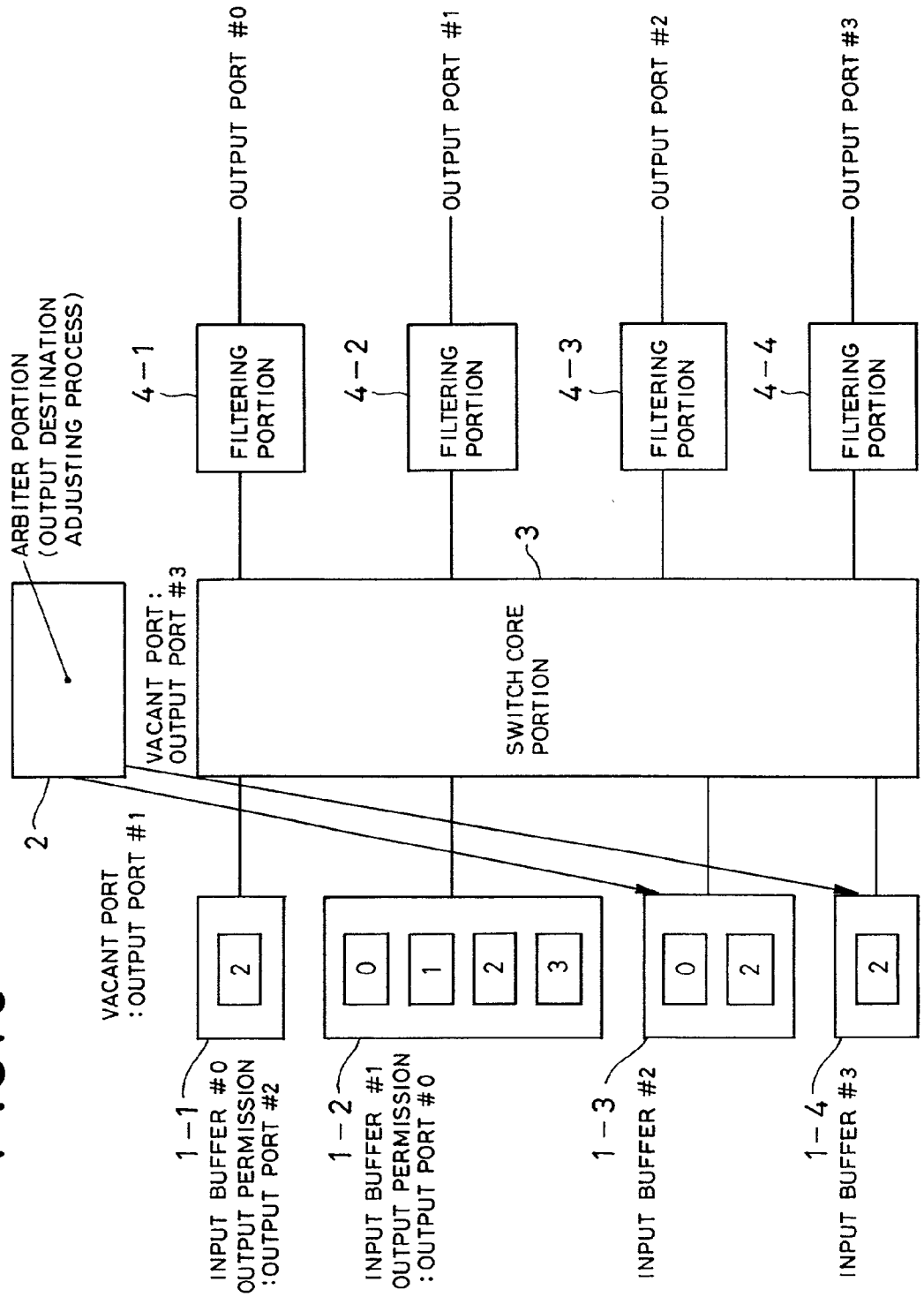
FIG. 8 is an illustration showing a condition after execution of a vacant port arbitration process in one embodiment of the packet switching equipment according to the present invention.

FIG. 8 is an illustration showing a condition after execution of a vacant port arbitration process in one embodiment of the packet switching equipment according to the present invention. In FIG. 8, the vacant port adjusting process assigns the idle output ports #1 and #3 to the idle input buffers #2 and #3, respectively.

Here, method for assigning the output permission is not limited to the shown method but can be any applicable methods. For example, it is possible to assign vacant output ports sorted in ascending order, the input buffer number in ascending order may be assigned.

Figure 9:
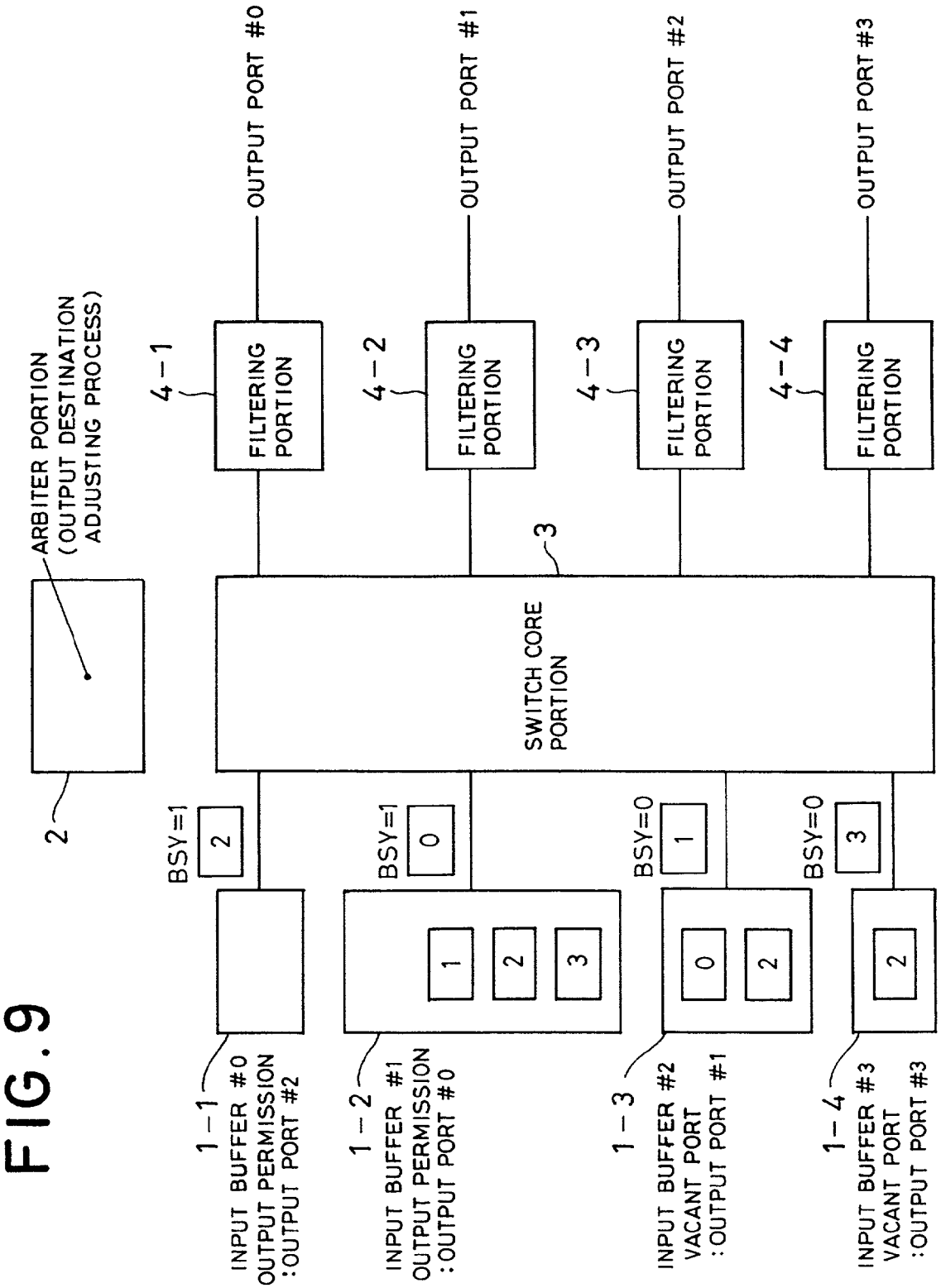
FIG. 9 is an illustration showing a condition of output destination arbitration process after execution of a vacant port arbitration process in one embodiment of the packet switching equipment according to the present invention.

FIG. 9 is an illustration showing a condition of output destination arbitration process after execution of a vacant port arbitration process in one embodiment of the packet switching equipment according to the present invention. In FIG. 9, the input buffer portions which obtained the output permission through the output destination adjusting process output the packets addressed to the corresponding output ports.

The input buffer portions assigned the vacant ports through the vacant port adjusting process output the dummy packets which are set "0" in the BSY portions and assigned vacant port number in the address portions.

Figure 10:
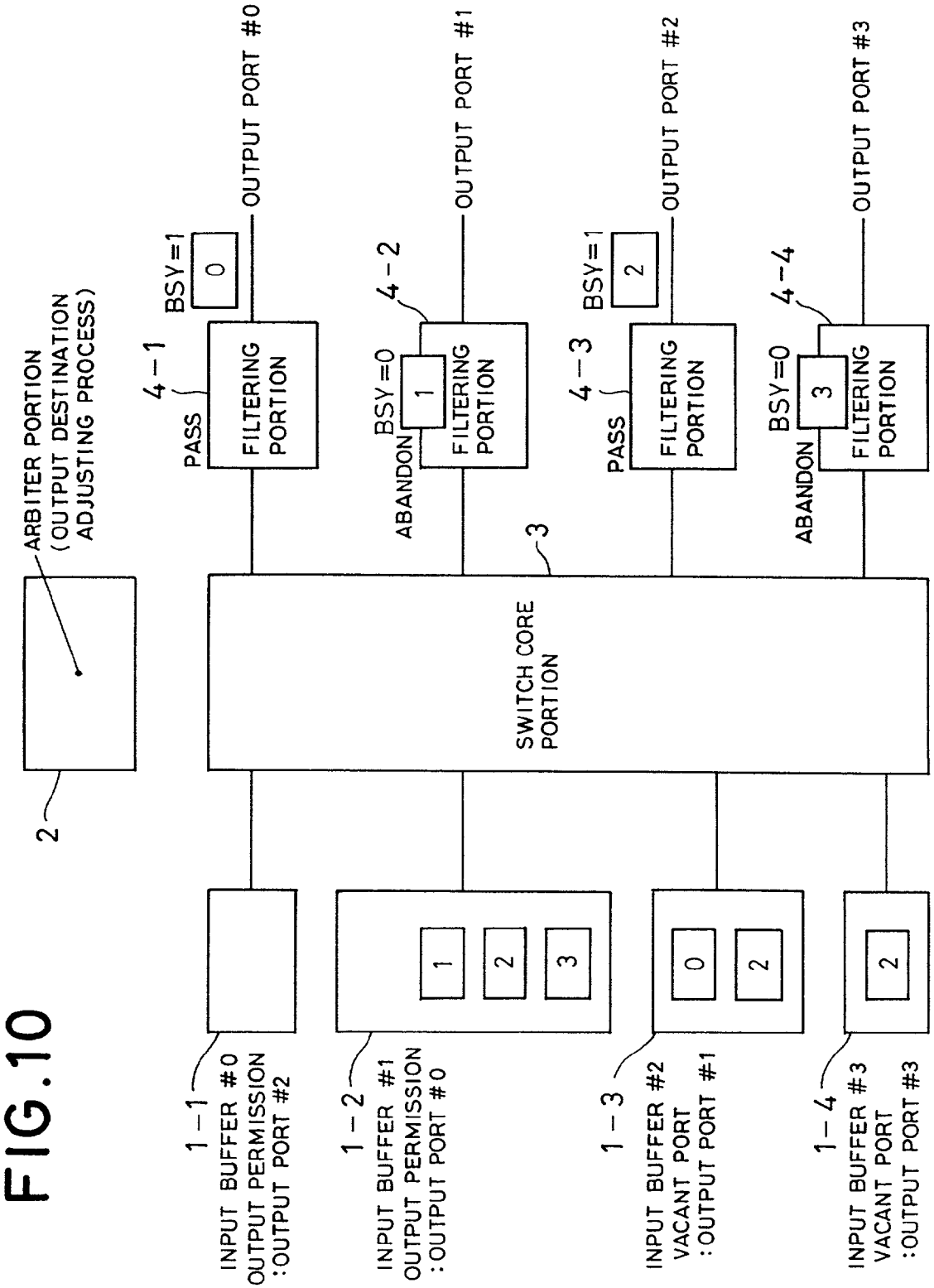
FIG. 10 is an illustration for explaining operation of the switch core portion and a filtering portion of FIG. 1.
Figure 11:
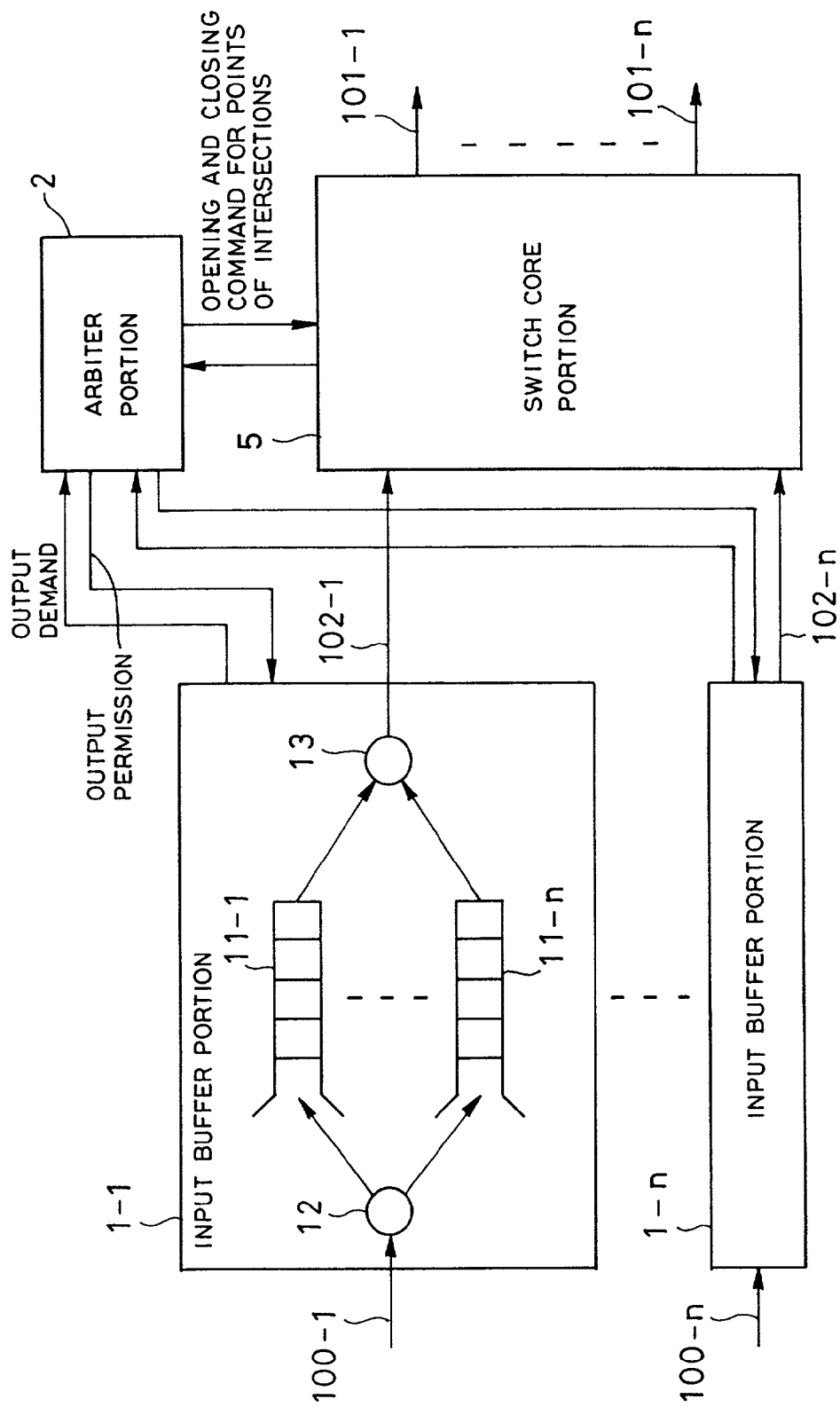
FIG. 11 is a block diagram showing a construction of the conventional packet switching equipment.
Figure 12:
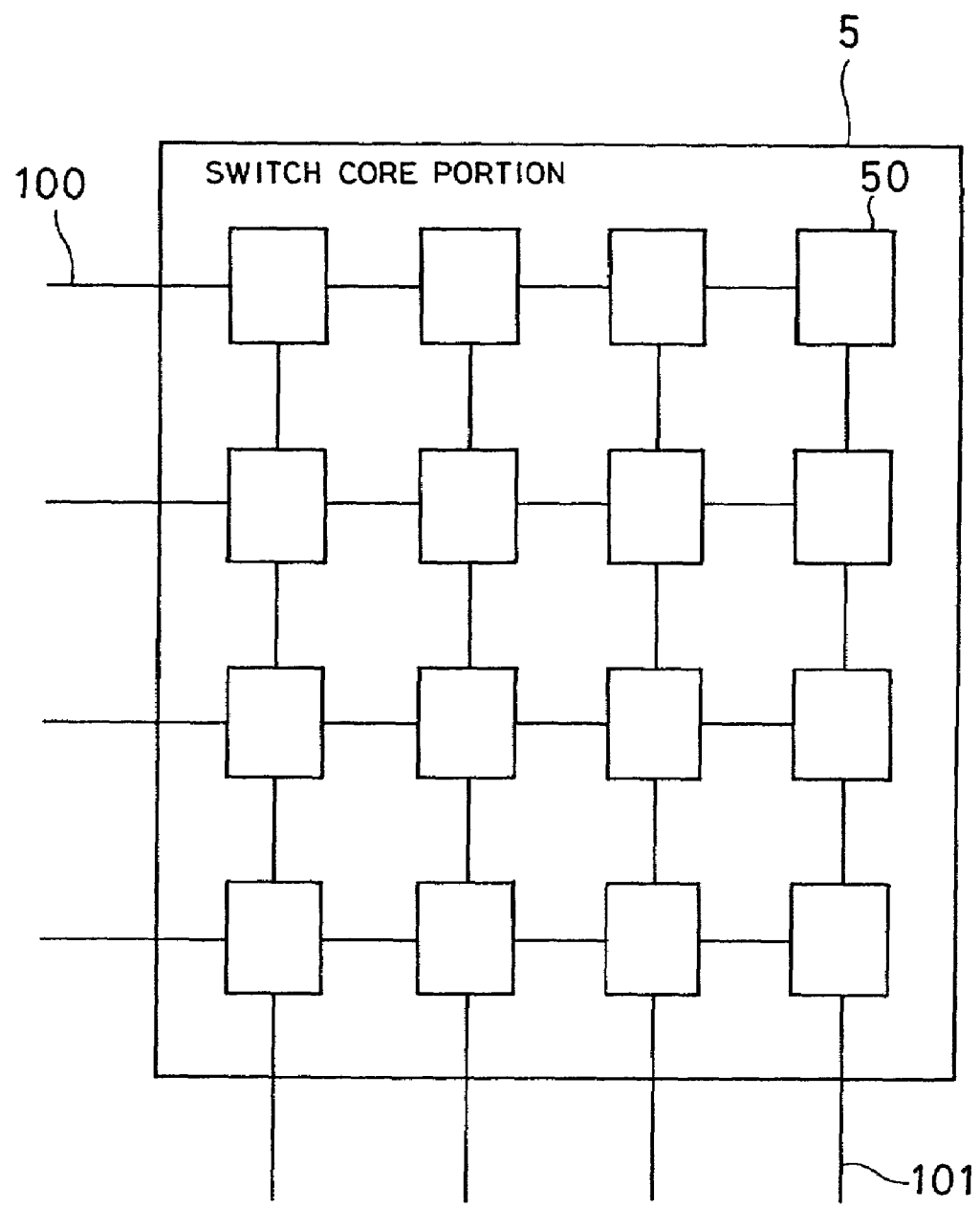
FIG. 12 is a block diagram showing a construction of the conventional switch core portion.
Figure 13:
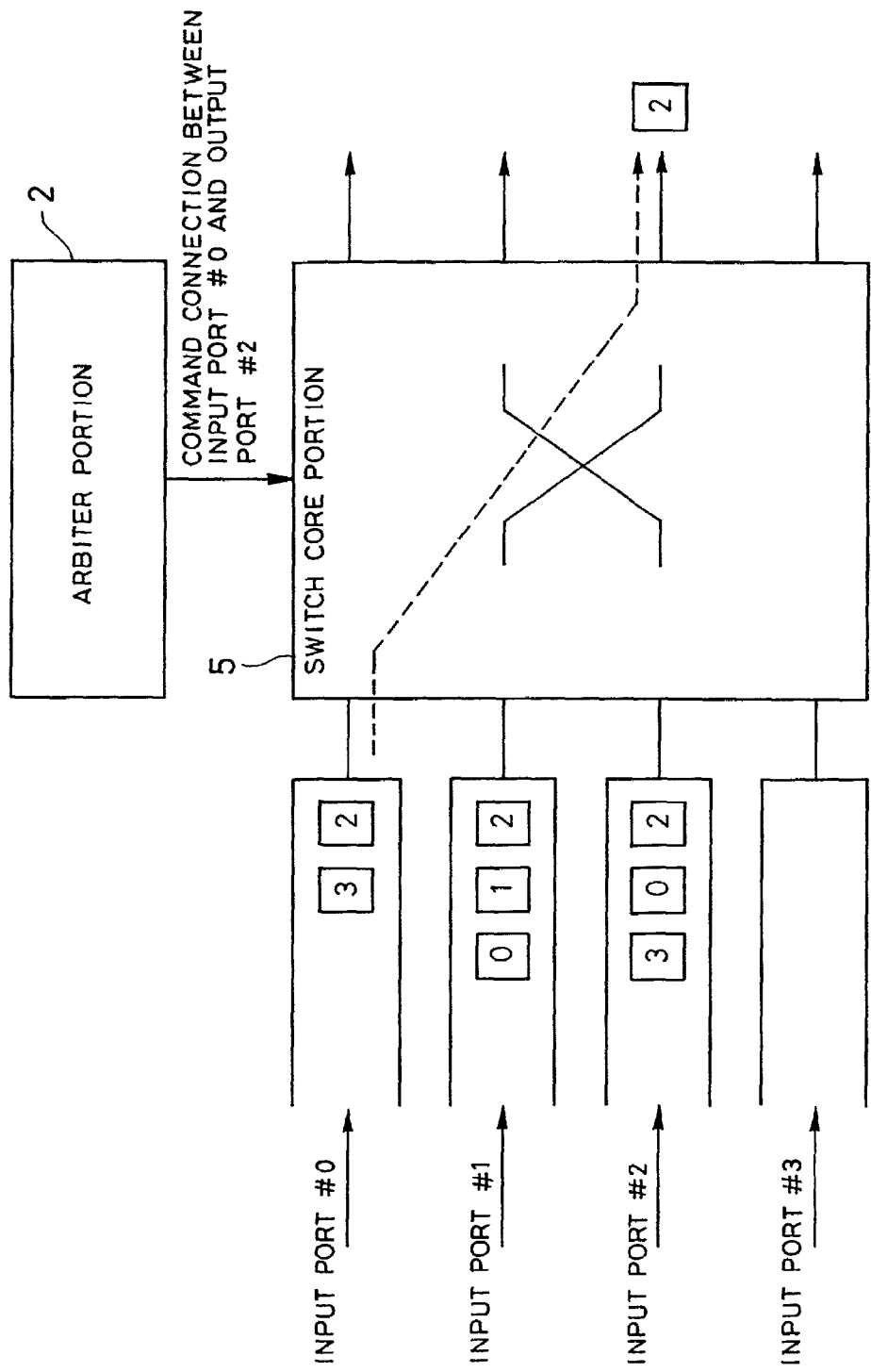
FIG. 13 is an illustration showing one condition showing operation process in the conventional packet switching equipment.

FIG. 10 is an illustration for explaining operation of the switch core portion 3 and a filtering portions 4-1 to 4-4 of FIG. 1. In FIG. 10, the sorting network as the switch core portion 3 performs sorting and concentration on the basis of the label values set in the address portions of the packet output from the input buffer portion 1-1 to 1-4. The shown operation is easily realized by applying the Batcher network as the sorting network.

Since packets for all output ports are present irrespective of valid packet and dummy packet, the packets can be output to the objective output ports by the sorting network. On the other hand, in the filtering portion 4-1 to 4-4 receiving the packet, the packet having BSY="0" is abandoned and the packet having BSY="1" is passed. At this time, the packet body from the payload portion of the packet format is taken out.

As set forth above, by employing the sorting network autonomously sorting and concentrating the packets on the basis of the labels applied to the input packets, such as Batcher network, in the switch core portion 3, by executing the output destination adjusting process giving output permission for outputting to the output ports 101-1 to 101-n for the input buffer portions 1-1 to 1-n with avoiding overlapping, and the vacant port adjusting process assigning the idle output ports not occupied by the input buffer portions 1-1 to 1-n for the idle input buffer portion not obtaining the output permission, by outputting the packets to the output ports 101-1 to 101-n assigned for the input buffer portions 1-1 to 1-n through the output destination adjusting process, and by generating and outputting the dummy packets addressed to the output ports 101-1 to 101-n by the input buffer portions, to which the output ports 101-1 to 101-n are assigned, through the vacant port adjusting process, the switch core portion 3 is permitted to operate independent of content of decision of the arbiter portion 2. Thus, the packet switching equipment with quite simple construction which does not require complicate control structure which establishes synchronization over the entire equipment, can be constructed.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

In the present invention, since the sorting network for autonomously sorting and concentrating the packets on the basis of the label applied to the packet, is employed in the switch core portion 3, the switch core portion 3 only performs autonomously sorting and concentrating with reference to only label of the input packet to permit operation independent of the content of decision made by the arbiter portion 2. Therefore, simple control of the packet switching equipment which does not require complicate control structure which establishes synchronization over the entire equipment, can be constructed.

On the other hand, in the present invention, by executing the output destination adjusting process for providing output permission for outputting to the output ports 101-1 to 101-n for the input buffer portions 1-1 to 1-n with avoiding overlapping and the vacant port adjusting process for assigning idle output port not occupied by any input buffer portion 1-1 to 1-n for the idle input buffer portion not obtaining the output permission, by outputting packets to addressed output ports 101-1 to 101-n by the input buffer portions 1-1 to 1-n assigned the output ports 101-1 to 101-n by the output destination adjusting process, and by generating and outputting the dummy packet addressed to the output ports 101-1 to 101-n by the input buffer portions 1-1 to 1-n assigned the output ports 101-1 to 101-n by the vacant port adjusting process, the packet can be accurately switched to the objective output port in the sorting network sorting and concentrating the packets in order of the labels.

Furthermore, by providing the information indicative of valid packet or dummy packet for the packet, and arranging the packet filtering portions 4-1 to 4-n for passing only valid packets and abandoning the null dummy packets, corresponding to the output ports 101-1 to 101-n of the packet switching equipment, the null dummy packet will never be output externally from the packet switch equipment to restrict wasting of the network resource.

As set forth above, with the present invention, in the packet switching equipment performing switching of packets between the input ports and the output ports, the packets arriving to the input port are output with labels indicative of the destination port number added in the input buffer portion, the packets are switched in the switch core portion on the basis of the labels added in the input buffer portion, the input buffer portions to provide output permission for outputting to the output ports are adjusted by the arbiter portion, and the sorting network for autonomously sorting and concentrating the packet on the basis of the labels provided for the packets is applied to the switch core portion. Therefore, the operation of the switch core portion can be independent of content of decision of the arbiter portion to construct the overall equipment with simple control structure.

What is claimed is:

1. A packet switching equipment for switching packets between input ports and output ports, comprising:
   input buffer portions temporarily storing packets arriving to said input ports, adding labels identifying destination port numbers to said packets, and outputting packets with the added labels;
   a switch core portion for switching said packets on the basis of the labels added by said input buffer portions;
   an arbiter portion providing output permissions to the input buffer portions for outputting to said output ports; and
   a sorting network autonomously sorting and concentrating said packets on the basis of said labels added to said packets being applied to said switch core portion,
   wherein said arbiter portion executes an output destination adjusting process for providing output permission for outputting to said output ports for said input buffer portions storing said packets with avoiding overlapping, and a vacant port adjusting process assigning idle output ports not occupied by any input buffer portions for idle input buffer portions not obtaining output permission.

2. A packet switching equipment as set forth in claim 1, wherein said input buffer portions assigned said output ports by said output destination adjusting process, output valid packets to the assigned output ports and said input buffer portions assigned said output ports by said vacant port adjusting process generate and output dummy packets addressed to the assigned output ports.

3. A packet switching equipment as set forth in claim 2, which further comprises packet filtering portions provided corresponding to respective output ports and passing only valid packets and abandoning dummy packets.

4. A switching control method for a packet switching equipment for switching packets between input ports and output ports, comprising:
  receiving packets at input buffer portions;
  adding labels to the packets at the input buffer portions, the labels identifying destination port numbers;
  switching said packets on the basis of the labels by a switch core portion;
  providing output permissions by an arbiter portion to the input buffer portions for outputting packets to said output ports by an arbiter portion; and
  employing a sorting network autonomously sorting and concentrating said packets on the basis of said labels added to the said packets in said switch core portion,
  wherein said arbiter portion executes an output destination adjusting process for providing output permission for outputting to said output ports for said input buffer portions storing said packets with avoiding overlapping and a vacant port adjusting process assigning idle output ports not occupied by any input buffer portions for idle input buffer portions not obtaining output permission.

5. A switching control method as set forth in claim 4, wherein said input buffer portions assigned said output ports by said output destination adjusting process, output packets to the assigned output ports and said input buffer portions assigned said output ports by said vacant port adjusting process generate and output dummy packets addressed to the assigned output ports.

6. A switching control method as set forth in claim 5, wherein only valid packets are passed and dummy packets are abandoned.

7. A packet switching equipment as set forth in claim 2 wherein the input buffer portions are configured to:
  designate packets as valid and invalid.

8. A packet switching equipment as set forth in claim 7 further comprising:
  a plurality of filter portions, each filter portion corresponding to a respective output port and being configured to:
    receive packets from the switch core portion,
    forward packets designated as valid, and
    drop packets designated as invalid.

9. A switching control method as set forth in claim 4 further comprising:
  designating, via the input buffer portions, packets as valid or invalid; and
  dropping packets designated as invalid prior to reaching the output ports.

10. A network device comprising:
  a plurality of output ports;
  a plurality of input buffer portions configured to:
    receive packets, and
    forward the packets toward the output ports, at least one input buffer portion of the plurality of input buffer portions being configured to generate and forward a dummy packet toward an output port of the plurality of output ports when the output port is idle; and an arbiter configured to provide output permissions to the plurality of input buffer portions, when providing the output permissions, the arbiter is configured to: provide a first output permission, to a first input buffer portion of the plurality of input buffer portions, for outputting a packet to a first output port of the plurality of output ports, and the arbiter being further configured to: assign the at least one input buffer portion to the idle output port.

11. The network device of claim 10 further comprising:
  a plurality of filter portions corresponding to the plurality of output ports and being configured to:
    drop the dummy packet prior to reaching the output port.

12. The network device of claim 10 wherein the plurality of input buffer portions is further configured to:
  add labels to the received packets, the labels identifying the plurality of output ports.

13. The network device of claim 12 further comprising:
  a switch core portion configured to switch packets from the plurality of input buffer portions toward the plurality of output ports based on the added labels.

* * * * *